United States Patent [19]
Fujii et al.

[11] Patent Number: 5,793,547
[45] Date of Patent: Aug. 11, 1998

[54] INFORMATION SIGNAL REPRODUCING APPARATUS WITH SIGNAL CORRECTING FUNCTION

[75] Inventors: Akio Fujii; Shinichi Yamashita, both of Yokohama; Toshiya Yatomi, Kawasaki; Motokazu Kashida, Musashino, all of Japan

[73] Assignee: Canon Kabushiki Kaisha, Tokyo, Japan

[21] Appl. No.: 218,703

[22] Filed: Mar. 28, 1994

Related U.S. Application Data

[63] Continuation of Ser. No. 591,408, Oct. 1, 1990, abandoned.

[30] Foreign Application Priority Data

| Oct. 2, 1989 | [JP] | Japan | 1-258344 |
| Oct. 2, 1989 | [JP] | Japan | 1-258345 |
| Oct. 2, 1989 | [JP] | Japan | 1-258347 |
| Oct. 2, 1989 | [JP] | Japan | 1-258348 |

[51] Int. Cl.$^6$ .................................. G11B 5/09
[52] U.S. Cl. .................................. 360/39; 386/21; 386/114; 386/116
[58] Field of Search .................................. 360/32, 38.1, 39; 358/336, 314; 386/21, 114, 116

[56] References Cited

U.S. PATENT DOCUMENTS

| 4,677,621 | 6/1987 | Sato et al. | 360/32 X |
| 4,758,902 | 7/1988 | Okamoto et al. | 360/32 X |
| 4,864,426 | 9/1989 | Gotoh | 360/38.1 X |
| 5,034,823 | 7/1991 | Geerlings | 360/38.1 X |

*Primary Examiner*—Andrew L. Sniezek
*Attorney, Agent, or Firm*—Robin, Blecker & Daley

[57] ABSTRACT

An information signal reproducing apparatus capable of correcting digital an information signal utilizing correction data, is formed from a reference signal contained in an information signal reproduced from a recording medium, in which the correction of the digital information signal is conducted behind a digital signal processor for processing the digital information signal corresponding to the reproduced information signal, so that the number of bits handled by the digital signal processor is minimized and the circuit magnitude of the digital signal processor is reduced.

17 Claims, 11 Drawing Sheets

| ADDRESS | SAMPLE DATA VALUE |
|---|---|
| 0 | $0 = D_a(0)$ |
| 1 | $D_a(1)$ |
| 2 | $D_a(2)$ |
| ⋮ | ⋮ |
| $n_D$ | $D_a(n_D)$ |
| $n_D+1$ | $255 = D_a(n_D+1)$ |

TABLE A

FIG. 11A

| ADDRESS | AVERAGE DATA VALUE |
|---|---|
| 0 | $0 = D_b(0)$ |
| 1 | $D_b(1)$ |
| 2 | $D_b(2)$ |
| ⋮ | ⋮ |
| $n_D$ | $D_b(n_D)$ |
| $n_D+1$ | $255 = D_b(n_D+1)$ |

TABLE B

FIG. 11B

| ADDRESS | STANDARD DATA |
|---|---|
| 0 | $0 = S(0)$ |
| 1 | $S(1)$ |
| 2 | $S(2)$ |
| ⋮ | ⋮ |
| $n_D$ | $S(n_D)$ |
| $n_D+1$ | $255 = S(n_D+1)$ |

TABLE C

FIG. 11C

| ADDRESS | DATA VALUE |
|---|---|
| $A_0$ | 0 |
| $A_1$ | $D_L(1)$ |
| $A_2$ | $D_L(2)$ |
| ⋮ | ⋮ |
| $A_{254}$ | $D_L(254)$ |
| $A_{255}$ | 255 |

TABLE D

INFORMATION SIGNAL REPRODUCING APPARATUS WITH SIGNAL CORRECTING FUNCTION

This is a continuation application under 37 CFR 1.62 of prior application Ser. No. 591,408, filed Oct. 1, 1990 now abandoned.

BACKGROUND OF THE INVENTION

1. Field of the Invention

The present invention relates to an information signal reproducing apparatus, and more particularly to, an information signal reproducing apparatus capable of correcting the characteristics of the reproduced information signal according to a reference signal contained in the reproduced information signal.

2. Related Background Art

In the field of such apparatus there is already known a video cassette recorder (VCR) capable of recording and reproducing a video signal containing a reference signal of a line in each frame, and, at the signal reproduction, processing the signal in such a manner that the reference signal assumes a predetermined wave form.

With the recent increase in the amount of information (recording band) resulting from the progress in the video signal toward higher definition and higher quality, there is conceived to record and reproduce the video signal in plural channels, but it is difficult to match the record/reproducing characteristics in different channels in such apparatus. There will result a difference between the reproduced signals of different channels, and such difference will appear as streaks on the reproduced image. In such apparatus, therefore, it is desirable to effect correction, utilizing a reference signal at the signal reproduction, for reducing the difference between different channels.

Figure 1:
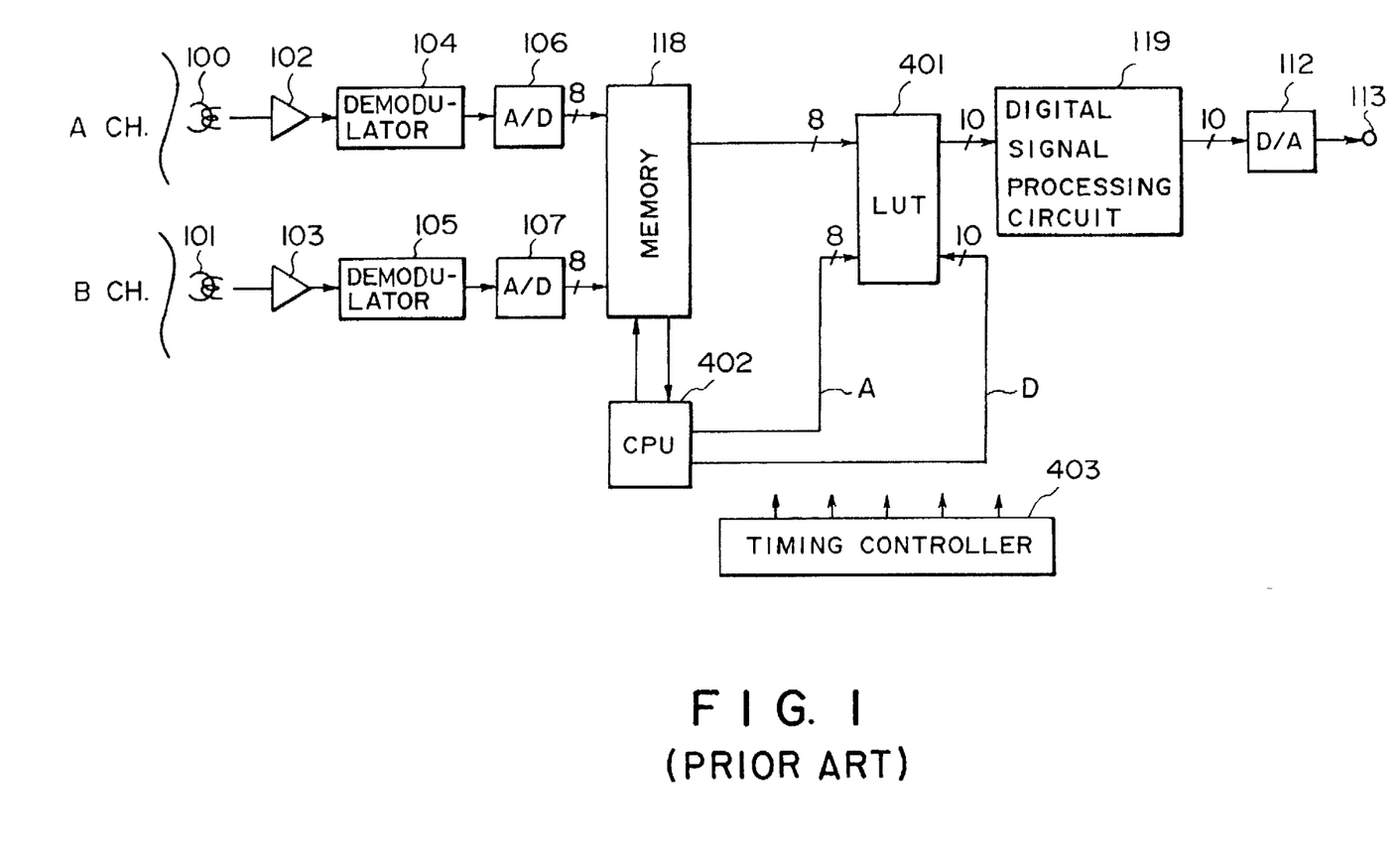
FIG. 1 is a block diagram of a reproducing system of a conventional video cassette recorder.

FIG. 1 is a schematic view of a reproducing system of a conventional video cassette recorder, wherein shown are reproducing heads 100, 101 respectively for A-channel (A-CH) and B-channel (B-CH); reproducing amplifiers 102, 103; FM demodulators 104, 105; analog/digital (A/D) converters 106, 107; a memory 118; a digital signal processing circuit 119; a digital/analog (D/A) converter 112; a look-up table (LUT) 401; a microprocessor (CPU) 402; and a timing controller 403.

Signals reproduced in the heads 100, 101 are amplified by the reproducing amplifiers 102, 103, then demodulated by FM demodulators 104, 105, digitized by A/D converters 106, 107 and stored in the memory 118.

In such structure, it is very difficult to mutually match the characteristics of analog circuits, such as the heads 100, 101, reproducing amplifiers 102, 103 and FM demodulators 104, 105 of the channels A and B. Consequently the reproduced signals obtained from the demodulators 104, 105 have mutually different characteristics.

The CPU 402 makes access to the memory 118 for fetching data, corresponding to the reference signals and present by a-line in each frame, from the video signals of the channels A and B. Based on the distortion of the reproduced reference signals of the channels A and B, the CPU 402 calculates correction data for the channels A and B for removing the difference between characteristics of both channels, and writes the correction data in the look-up table 401 during a vertical horizontal blanking period. If the reproduced data digitized by the A/D converters 106, 107 are of 8 bits, the correction data have to be about 10 bits for appropriate correction of the characteristics. Thus the CPU 402 writes correction data D of 10 bits in the look-up table 401, according to 8 bit addressing data A.

Under the control by the timing controller 403, the memory 118 sends the reproduced video data to the look-up table 401, after data restoration if the reproduced video data are shuffled, or after time-axis expansion or compression if the time axis conversion is applied.

The look-up table 401 eliminates the difference in characteristics between the channels A and B, by applying correction to the video data reproduced from the channel A with the correction data for the channel, and applying correction to the video data reproduced from the channel B with the correction data therefor.

The video data corrected in the look-up table 401 are sent to the digital signal processing circuit 119 for digital signal processing such as filtering or de-emphasis, and are then supplied to the D/A converter 112, which releases an analog video signal from the output terminal 113.

In the above-explained structure, however, if the reproduced video data are digitized with 8 bits, a data expansion of about 2 bits is necessary for effective correction in the look-up table 401 with appropriate definition, so that the reproduced video data after correction become 10 bits. Consequently the subsequent digital signal processing has to be conducted with 10 bits, so that the digital signal processing circuit 119 has to be magnified in hardware structure.

Figure 4:
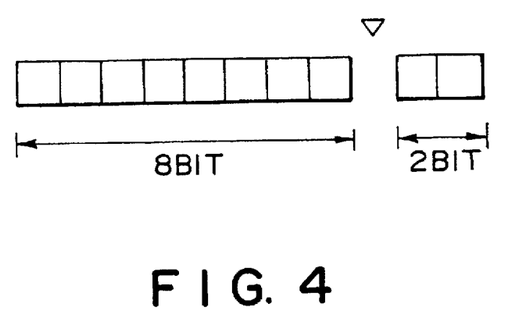
FIGS. 4 and 5 are schematic views showing data handled in various parts of the circuit shown in FIG. 3.

Also because the correction data D become 10 bits, the CPU 402 will be given a larger load of access to the look-up table 401. More specifically, the CPU 402 will have to make two accesses to the look-up table 401 for writing correction data therein because of the expansion in the number of bits of the correction data as shown in FIG. 4, so that the CPU 402 has to be capable of high-speed processing.

Also because of a longer access time from the CPU 402 to the look-up table 401, the rewriting of data of the look-up table 401 cannot be made frequently, whereby the adaptive correction of the reproduction characteristics becomes difficult. Besides 10-bit input/output ports are required in the CPU 402 and the look-up table 401, with resulting complication in hardware, and the timing control between the CPU 402 and the look-up table 401 becomes complicated.

Furthermore, in the above-explained conventional structure, the reproduced video data cannot be obtained during the rewriting of correction data in the look-up table 401 by the access of the CPU 402 thereto. Consequently the CPU 402 can only make access to the look-up table 401 during the vertical or horizontal blanking period, and the look-up table 401 cannot be operated properly if the table rewriting requires a period of plural fields. Stated differently, during the table rewriting over plural fields, the reproduced image becomes distorted as the reproduced video signal cannot be corrected.

Furthermore, in the above-explained conventional structure in which the correction data are prepared for each frame based on data sampled in each frame, an eventual error in the level reference signal, resulting for example from a dropout, may cause an error in the sampled data, thereby affecting the corrected data.

For this reason the reproduced video signal of a frame containing an error in the level reference signal does not match with the video signal of other frames, eventually inducing unpleasant flickering on the reproduced image.

SUMMARY OF THE INVENTION

An object of the present invention is to eliminate the above-mentioned drawbacks of the prior technology.

Another object of the present invention is to provide an information signal reproducing apparatus capable of precise correction of reproduction characteristics, while minimizing the magnitude of hardware.

The foregoing objects can be attained, according to an embodiment of the present invention, by an information signal reproducing apparatus comprising:

reproduction means for reproducing information signal containing reference signal from a recording medium;

correction data forming means for forming correction data, based on the reference signal in the information signal reproduced by reproduction means;

digital signal processing means for processing digital information signal corresponding to the information signal reproduced by reproduction means; and correction means for correcting the digital information signal, processed by digital signal processing means, by means of correction data and releasing corrected digital information signal.

Still another object of the present invention is to provide an information signal reproducing apparatus capable of correction of the reproduction characteristics even during the table rewriting operation, whereby the table rewriting is rendered possible even with a slower access for write-in to the table.

The above-mentioned object can be attained, according to another embodiment of the present invention, by an information signal reproducing apparatus comprising:

reproduction means for reproducing information signal containing reference signal from a recording medium;

correction data forming means for forming correction data, based on the reference signal in the information signal reproduced by reproduction means; and correction means for correcting digital information signal corresponding to the information signal reproduced by reproduction means, by means of correction data, and releasing corrected digital information signal;

wherein correction means includes look-up table means which the said correction data and is addressed by digital information signal, look-up table means is adapted to release only a part of the corrected digital information signal.

Still another object of the present invention is to provide a signal reproducing apparatus capable of stable correction of the reproduction characteristics thereby providing distortion-free reproduced signals even if the reproduction reference signal cannot be obtained in a stable manner.

The above-mentioned object can be attained, according to still another embodiment of the present invention, by a signal reproducing apparatus, comprising:

reproduction means for reproducing information signal containing reference signal in periodic manner from a recording medium;

correction data forming means for forming correction data, based on the reference signal in the information signal reproduced by said reproduction means, correction data forming means is adapted to form correction of a kind from plural reference signals in the information signal reproduced by reproduction means; and correction means for correcting digital information signal, corresponding to the information signal reproduced by reproduction means, with the correction data and releasing corrected digital information signal.

Still other objects of the present invention, and the features thereof, will become fully apparent from the detailed description of the preferred embodiments, which is to be taken in conjunction with the attached drawings.

DETAILED DESCRIPTION OF THE PREFERRED EMBODIMENTS

Figure 2:
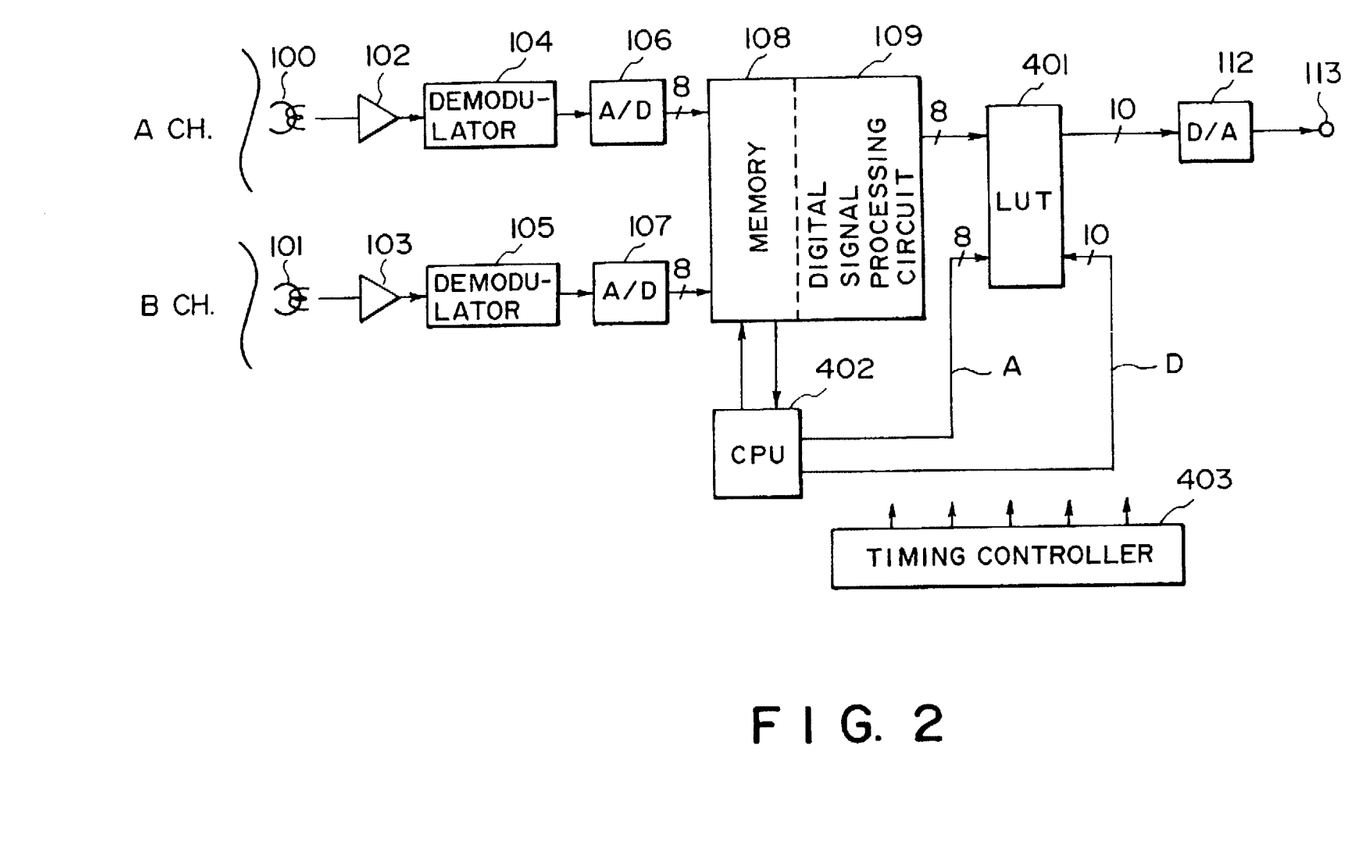
FIG. 2 is a block diagram of a reproducing system of a video cassette recorder constituting an embodiment of the present invention.

FIG. 2 is a block diagram of a reproducing apparatus constituting an embodiment of the present invention, wherein components of same functions as those in FIG. 1 are represented by same numbers, and following description will be concentrated on the points different from the system shown in FIG. 1.

In FIG. 2, there are shown a memory 108 for storing the reproduced signals of the channels A and B; and a digital signal processing circuit 109 for applying correction such as filtering to the video data stored in the memory 108.

The CPU 402 makes access to the memory 108 storing the reproduced signals in the channels A and B, thereby reading data corresponding to the reproduced signals of the aforementioned reference signals of the channels A and B. Then the CPU 402 calculates correction values from the distortions in the data of thus read reproduced reference signals, and stores the correction value for the reproduced video data of the channel A and that for the channel B in the look-up table 401, respectively according to 8-bit addressing data.

The memory 108, storing the reproduced signals of the channels A and B, restores the reproduced video data divided in the channels A and B into the original state under the timing control by the timing controller 403; and sends thus restored video data in 8 bits to the digital signal processing circuit 109. The circuit 109 applies digital signal processing such as filtering, or color difference line simultaneousness for color signal to the reproduced video data and sends the processed data in 8 bits to the look-up table 401. Under the timing control by the timing controller 403, the look-up table 401 corrects the characteristics of the reproduced video data of the channel A with the correction data therefor and those of the channel B with the correction data therefor, and sends the corrected data, expanded to 10 bits to the D/A converter 112.

As explained above, the look-up table 401 for correcting the reproduction characteristics is provided immediately in front of the D/A converter 112, whereby other digital signal processings can all be conducted in 8-bit state, and the magnitude of the hardware of the digital signal processing circuits can be successfully reduced.

More specifically, in the video cassette recorder of the present embodiment, all the data processings in digital system can be conducted with 8 bits and the magnitude of the hardware can be reduced, by placing the look-up table immediately in front of the D/A converter, effecting the digital signal processing before the look-up table and effecting the bit expansion last.

As explained in the foregoing, the information signal reproducing apparatus shown in FIG. 2 is capable of precise correction of the reproduction characteristics, while minimizing the magnitude of entire hardware.

Figure 3:
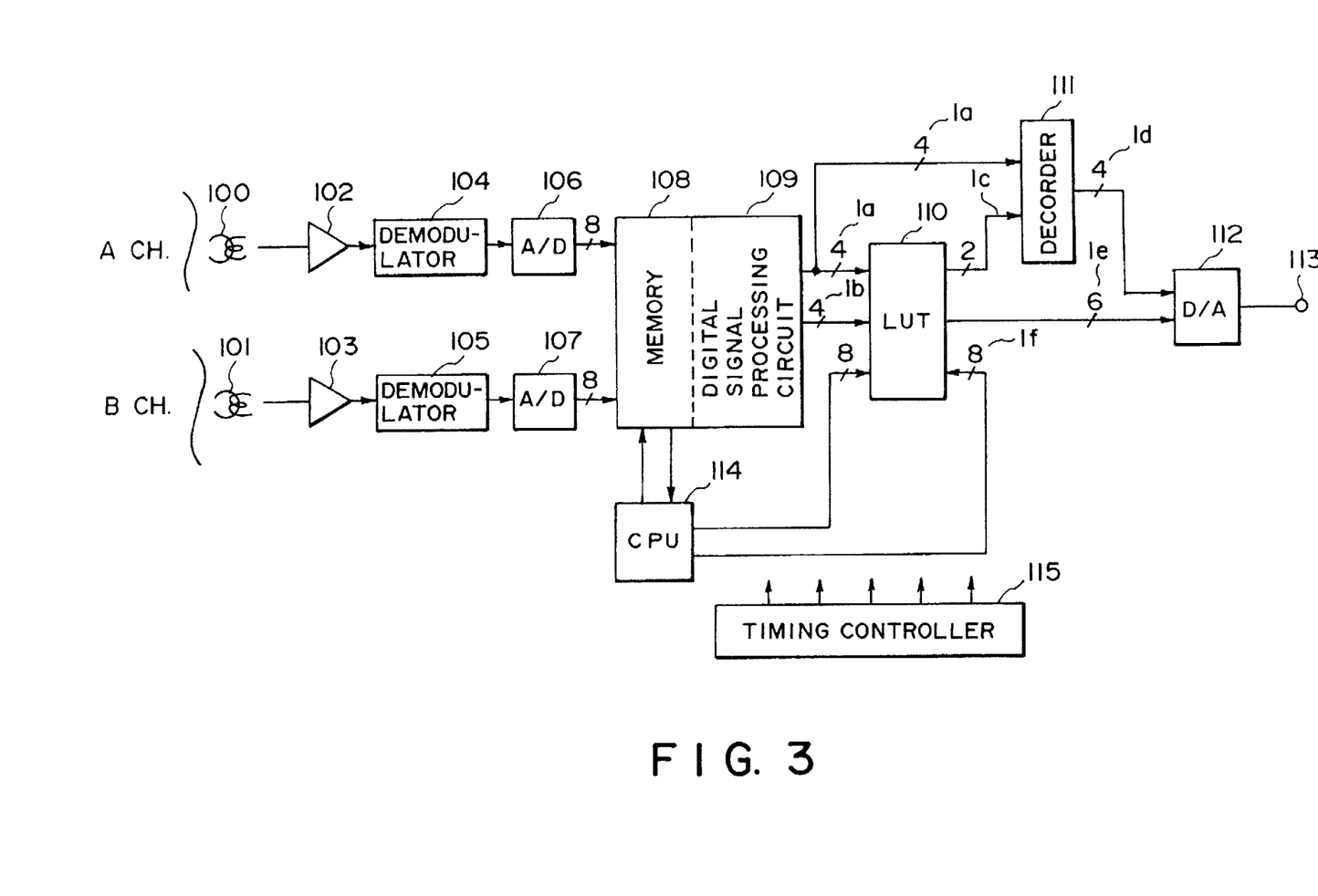
FIG. 3 is a block diagram of a reproducing system of a video cassette recorder constituting another embodiment of the present invention.

FIG. 3 is a block diagram of a reproducing system of a video cassette recorder constituting another embodiment of the present invention, wherein equivalent components to those in FIG. 1 or 2 are represented by same numbers. In the following the explanation will be concentrated on the different points. There are provided a look-up table 110, a decoder 111, a CPU 114, and a timing controller 115.

The digital signal processing circuit 109 applies signal processing such as filtering or de-emphasis to the reproduced video data stored in the memory 108, and sends 8-bit data to the succeeding look-up table 110.

Figure 5:
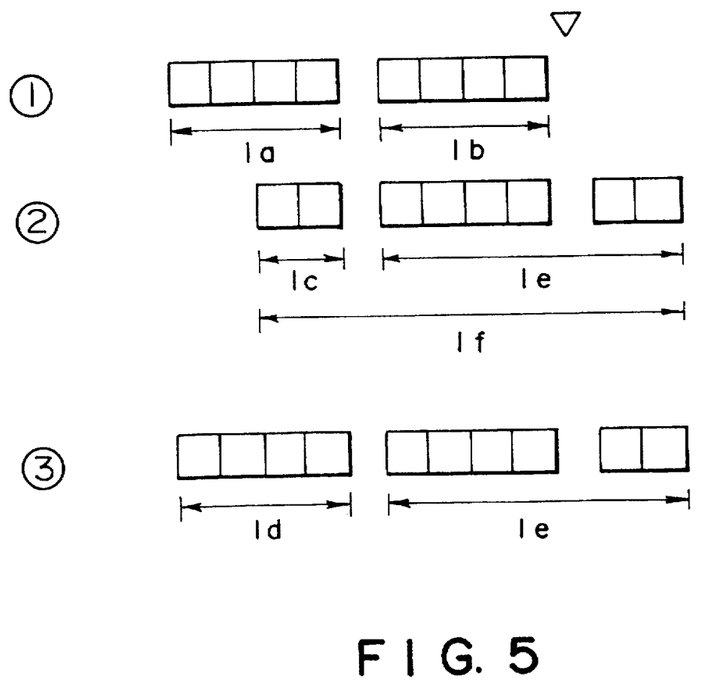

The CPU 114 makes access to the memory 108, thereby fetching data, respectively for the channels A and B, corresponding to the reference signal of a line contained in each frame. Then the CPU 114 detects the distortion of the reproduced reference data of the channels A and B, calculates the correction values for the channels so as to cancel the difference in the characteristics of the channels A and B, and records the correction data D for the channels A and B in the look-up table 110. As shown in FIG. 5, which shows various data with aligned decimal point position, the correction data D are composed of lower 8 bits (2) of 10-bit correction data (3) expanded from the reproduced video data (1), and the CPU 114 records only lower 8 bits of the correction data in the look-up table 110.

The look-up table 110 receives upper 4 bits (1a) and lower 4 bits (1b) of the reproduced video data (1) from the digital signal processing circuit 109, and releases lower 8 bits of corresponding correction data (upper 2 bits (1c) and lower 6 bits (1e)) as the corrected reproduced video data. Among the 8 bits, the lower 6 bits (1e) are supplied to the D/A converter 112, while the upper 2 bits (1c) are supplied to the decoder 111. The decoder 111 also receives the upper 4 bits (1a) of the reproduced video data from the digital signal processing circuit 109.

Since the amount of correction based on the distortion of the reproduced reference signal is about 5% at maximum with respect to the original signal, the amount of correction is always smaller than $2^4$, so that, in the comparison between the reproduced video data (1) (composed of upper 4 bits (1a) and lower 4 bits (1b)) and the corrected reproduced video data (composed of upper 4 bits (1d) and lower 6 bits (1e)), the carry-over between the digits $2^3$ and $2^4$ is limited to 0 or ±1. Based on this fact, the decoder 111 decodes the upper 4 bits of the reproduced video data from the upper 4 bits (1a) of the reproduced video data and the upper 2 bits (1c) of lower 8 bits of the reproduced and corrected video data in the following manner.

TABLE 1

| | 1c | | | |
|---|---|---|---|---|
| 1a | 00 | 01 | 11 | 10 |
| 00 | 0 | +1 | −1 | / |
| 01 | −1 | 0 | / | +1 |
| 11 | +1 | / | 0 | −1 |
| 10 | / | −1 | +1 | 0 |

TABLE 2

| 1c | |
|---|---|
| 00 | 0 |
| 01 | +1 |
| 10 | −1 |

Table 1 shows the carry-over between the digits $2^3$ and $2^4$, as a function of lower two bits of the upper 4 bits (1a) of the reproduced video data shown in the vertical column, and upper two bits (1c) of the reproduced video data shown in the horizontal row. "0" indicates no change in the upper 4 bits (1a) of the reproduced video data; "+1" indicates a carry-over of one to 4 bits (1a); "−1" indicates a carry-over of one from 4 bits (1a); and "/" indicates an impossible combination. Thus the decoder 111 releases the upper 4 bits (1d) of the reproduced video data corrected according to Table 1, based on the upper 4 bits (1a) of the reproduced video data and the upper 2 bits (1c) of the reproduced and corrected video data. Consequently the reproduced and corrected video data of 10 bits in total can be obtained by combining the 4 bits (1a) from the decoder 111 and the 6 bits (1e) from the look-up table 110.

Also similar result to the foregoing can be attained by employing correction data of 6 bits (1e) and data of 2 bits (1c) shown in Table 2, wherein "00" indicates the absence of change in the upper 4 bits (1a) of the reproduced video data, "01" indicates a carry-over of one, and "10" indicates a carry-over of minus one, as the data written into the look-up table 110 from the CPU 114 and obtaining the upper 4 bits in the decoder 111.

As explained in the foregoing, the embodiment shown in FIG. 3, because of the presence of the decoder 111, the correction data to be written from the CPU 114 to the look-up table 110 can be made 8 bits, whereby the load on the CPU 114 for the access to the look-up table 110 is reduced and the time required for access is also reduced. It is therefore rendered possible to frequently rewrite the look-up table 110, and to correct the reproduction characteristics in more flexible manner. Also the magnitude of hardware can be reduced since the input/output ports of the CPU 114 and the data input and output of the look-up table 110 can be of 8 bits. Besides the timing control can be simplified as the access from the CPU 114 to the look-up table 110 is made simpler.

Figure 6:
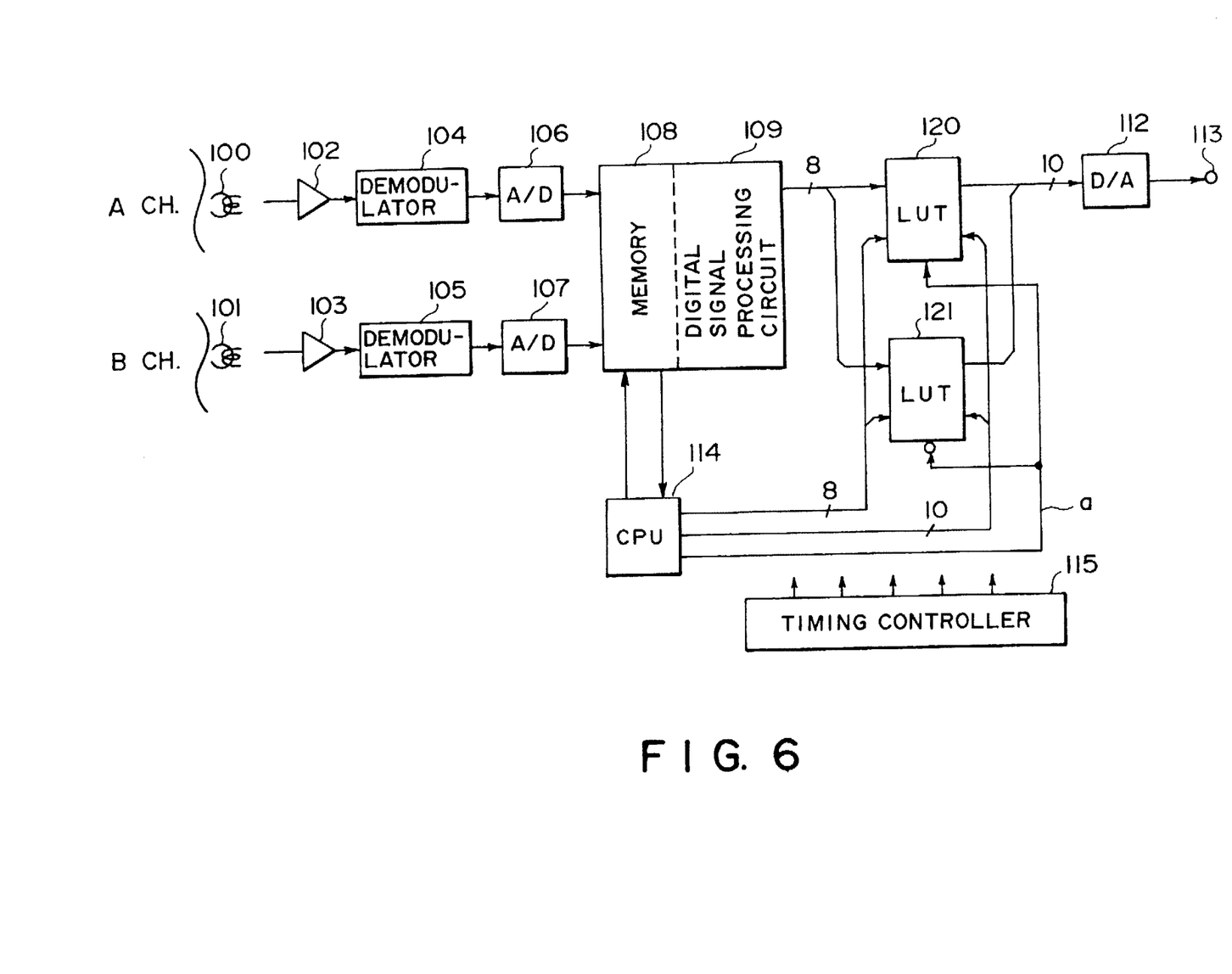
FIG. 6 is a block diagram of a reproducing system of a video cassette recorder constituting still another embodiment of the present invention.

FIG. 6 is a block diagram of a reproducing system of a video cassette recording constituting still another embodiment of the present invention, wherein equivalent components to those in FIGS. 1–3 are represented by same numbers. In the present embodiment there are provided look-up tables 120, 121.

In the following there will only be explained the differences from the foregoing embodiments.

The digital signal processing circuit 109 applies process such as filtering or de-emphasis on the reproduced video data stored in the memory 108, and sends 8-bit data to the look-up tables 120, 121.

The look-up tables 120, 121 are so constructed that either is ready for correcting the reproduced video data while the other is awaiting the access by the CPU 114 for table rewriting. For example when a switching signal a from the CPU 114 is at the low level, the look-up table 121 does not accept the reproduced video data but is in a standby state for access from the CPU 114 for table rewriting, while the other look-up table 120 does not accept the access from the CPU 114 for table rewriting but effects the correction of the reproduced video data.

The CPU 114 makes access to the memory 108, thereby fetching, in the channels A and B, data corresponding to the reference signal of a line contained in each frame of the video signal. Then the CPU 114 detects the distortions of the reproduced reference data of the channels A and B, calculates the correction values for both channels, and stores the correction data for the channels A and B in the look-up table 121.

Upon correction of correction data in the look-up table 121, the CPU 114 shifts the switching signal a to the high level, whereby the look-up table 121 does not accept the access from the CPU 114 for table rewriting but effects correction of the reproduction characteristics of the reproduced video data, while the look-up table 120 does not accept the reproduced video data but awaits the access from the CPU 114 for table rewriting.

Thus, under the control by the timing controller 115, the reproduced video data are read from the memory 108 and the digital signal processing circuit 109, and the look-up table 121 effect corrections for the channels A and B respectively on the data reproduced from the channels A and B. The obtained data are converted into analog signal by the D/A converter 112 and released from the output terminal 113.

When the look-up table 120, which has been in the standby state for the access from the CPU 114 for table rewriting, is subjected to the rewriting of correction data by the access from the CPU 114, said CPU 114 again shifts the switching signal a to the low level, thereby switching the look-up table 120 to the correction of the reproduced video signal and the look-up table 121 to the standby state for the access from the CPU 114 for table rewriting. Thereafter the above-explained operations are repeated.

As explained in the foregoing, based on the use of two look-up tables, the present embodiment allows the reproduced video data to be obtained even during the re-writing of the look-up table by the CPU and is free from the limitation that the access of the CPU to the look-up table is limited to the blanking period. Thus the table re-writing does not require plural field periods, so that the correction of the reproduced video signal can be made in a more flexible manner and always without distortion.

Also the timing control of the access of CPU to the look-up table is simplified.

In the foregoing embodiments shown in FIGS. 2 to 6, there have been explained apparatus for reproducing signals of two channels wherein the correction of the reproduction characteristics is conducted to compensate the difference in the characteristics of these two channels, but the present invention is similarly effective in an apparatus for reproducing the signal of a channel in which the reproduction characteristic is corrected with a look-up table for compensating the linearity of the characteristic.

Figure 7:
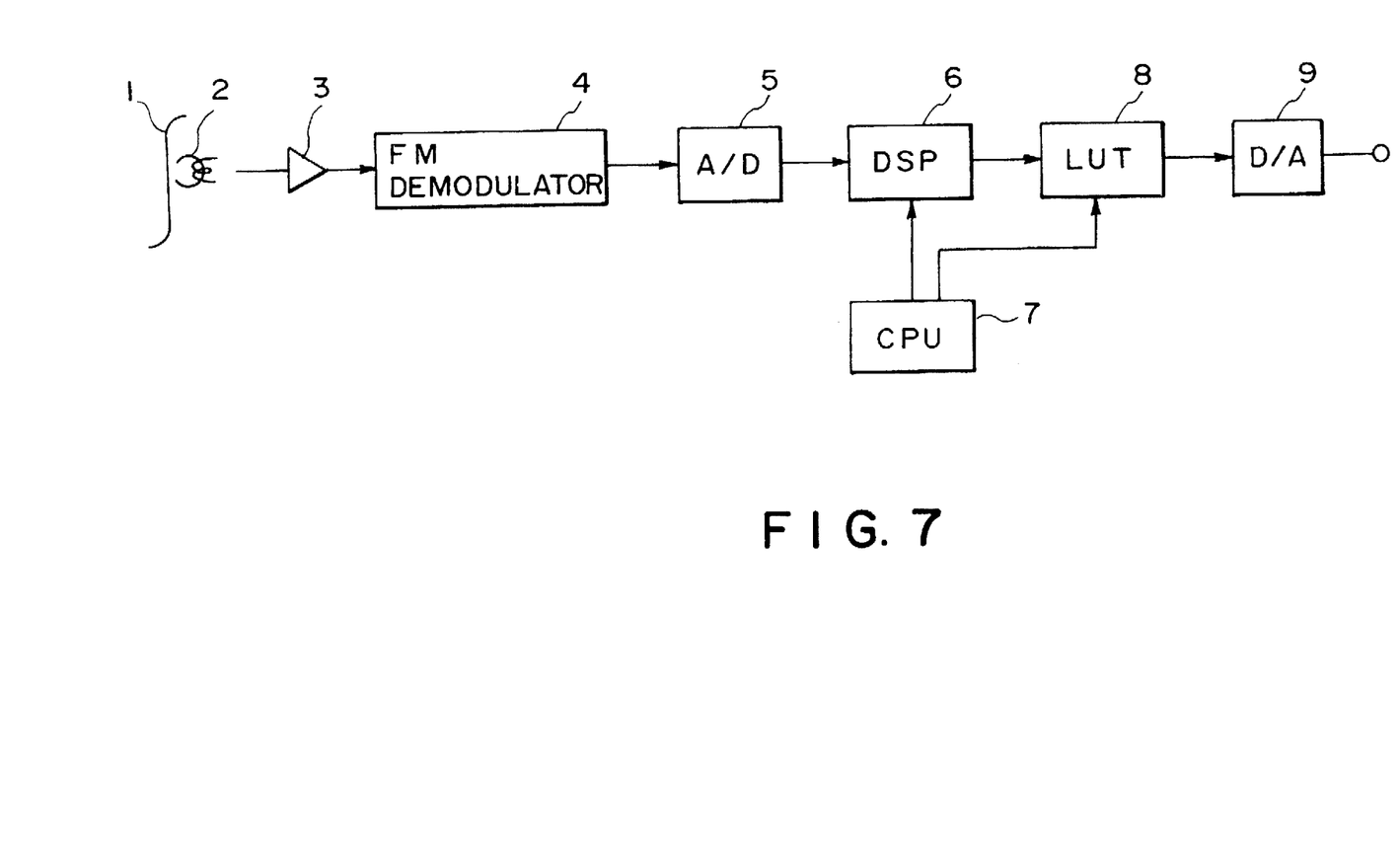
FIG. 7 is a block diagram of a reproducing apparatus embodying the present invention.

FIG. 7 is a block diagram of a reproducing apparatus embodying the present invention, wherein shown are a magnetic tape 1 constituting a recording medium; a reproducing head 2 for reproducing the signal recorded on the magnetic tape 1; an amplifier 3 for amplifying the signal from the reproducing head 2; an FM demodulator for demodulating the video signal from the amplifier 3; an A/D converter 5 for converting the signal from the FM demodulator 4 into digital signal; a digital signal processor (DSP) 6 for processing the video signal digitized in the A/D converter 5 and generating sampling data of the ramp wave form to be explained later; a microprocessor (CPU) 7 for processing the sampling data of the ramp wave form from the DSP 6 and storing obtained correction values in a look-up table (LUT); a look-up table 8 to be addressed by the video signal from the DSP and used for correcting the video signal; and a D/A converter 9 for converting the digital signal from the look-up table into analog signal.

Figure 8:
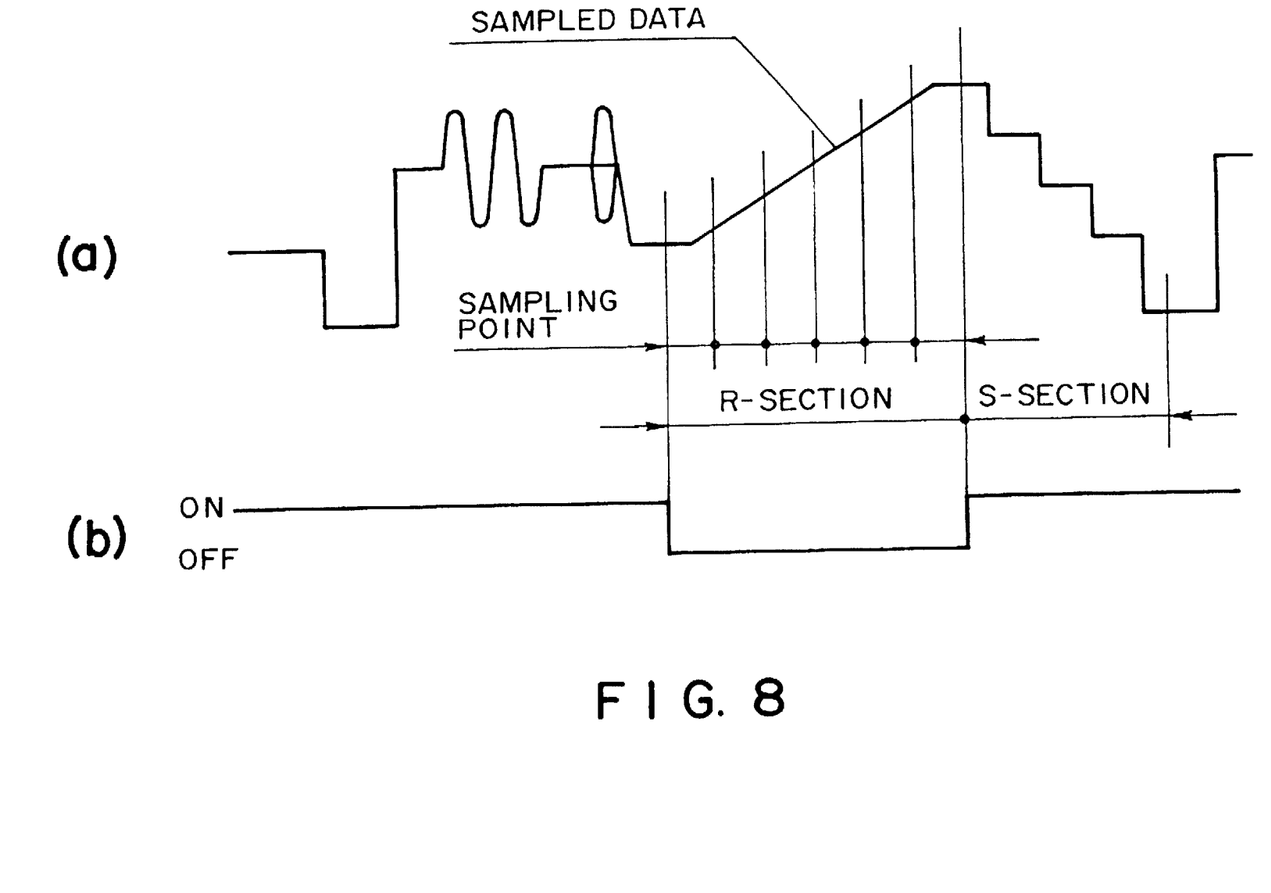
FIG. 8 is a wave form chart showing a reference signal reproduced by the reproducing apparatus shown in FIG. 7 and a masking signal therefor.

In FIG. 8, (a) indicates the reference signal contained in the video signal reproduced by the apparatus of the present embodiment. The reference signal is contained as a signal of a line in each frame of the video signal. In the present embodiment, a ramp wave section R in the reference signal is sampled at different points, and the obtained sampled data are used for correcting the reproduction characteristics. (a) indicates an example of the sampling points.

In the following there will be explained the function of the above-explained components with reference to FIG. 7.

The video signal recorded on the magnetic tape 1 is reproduced by the reproducing head 2 and is amplified by the amplifier 3. The amplified video signal is demodulated by the FM demodulator 4, and digitized by the A/D converter 5. The digitized video signal is supplied for predetermined processing in the DSP 6. Said DSP 6 also applies masking to the ramp wave form, contained in each frame of the video signal, with a masking signal (b) in FIG. 8 of a period based on the, synchronization signal, effects plural samplings within the period of masking and stores the sampled data in a random access memory (RAM) in the DSP 6. Then the CPU 7 calculates, for each frame, correction data to be stored in the look-up table 8, based on the sampling data stored in the RAM of the DSP 6.

Figure 9:
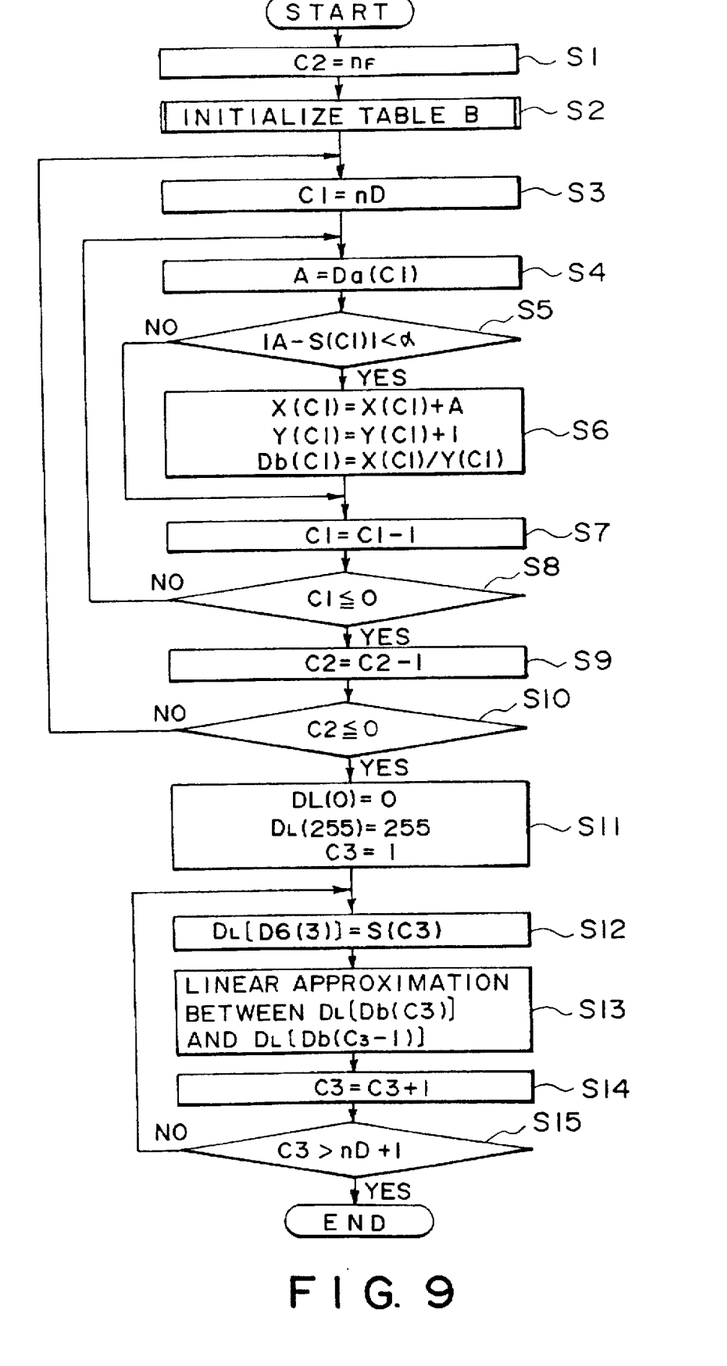
FIG. 9 is a flow chart showing an example of control sequence of the CPU shown in FIG. 7.
Figure 10:
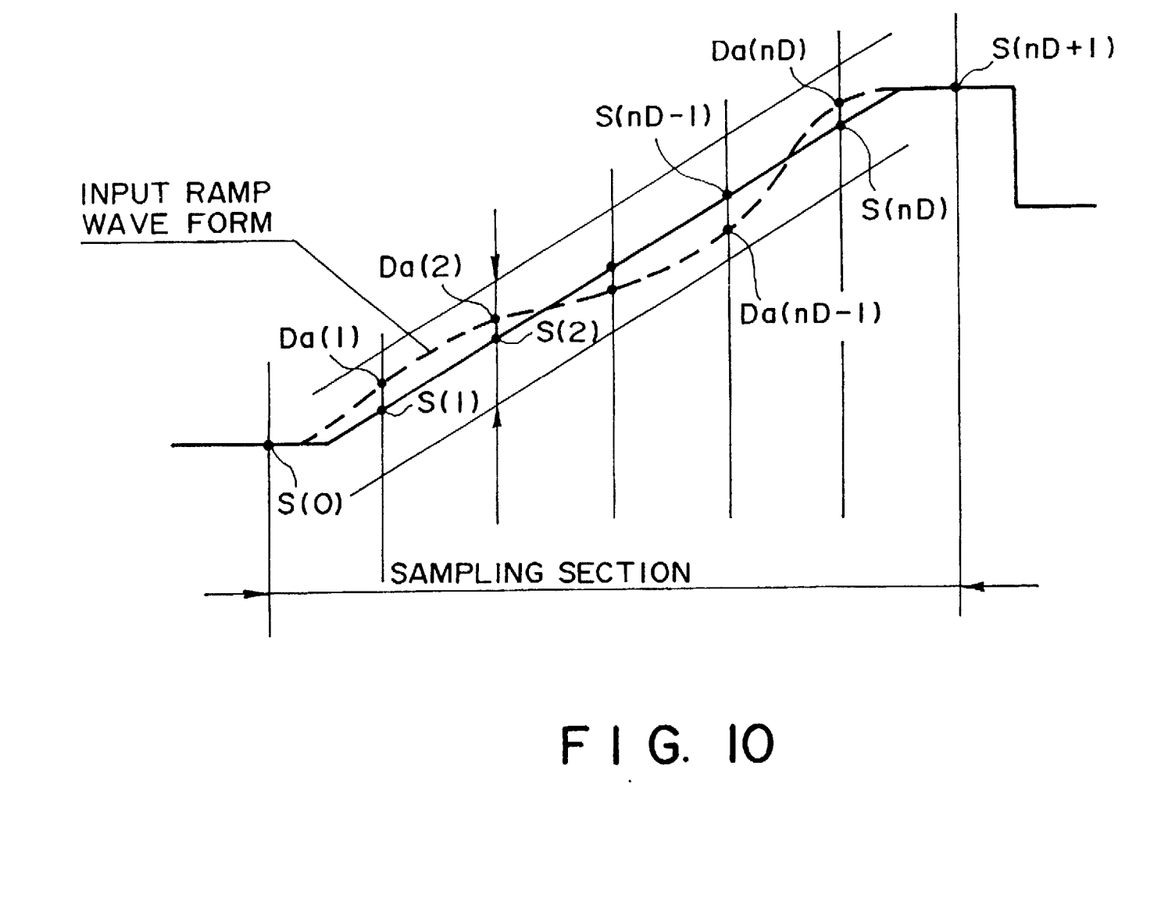
FIG. 10 is a chart showing sampling points and sampled data of a ramp wave form in the reference signal shown in FIG. 8.

The details of the calculation will be explained in the following with reference to FIGS. 9, 10 and 11, which are respectively a flow chart of calculation of the correction data by the CPU 7; a chart showing the sampled data of the ramp wave form; and views of data tables in the CPU 7 and look-up table 8.

Figure 11A:
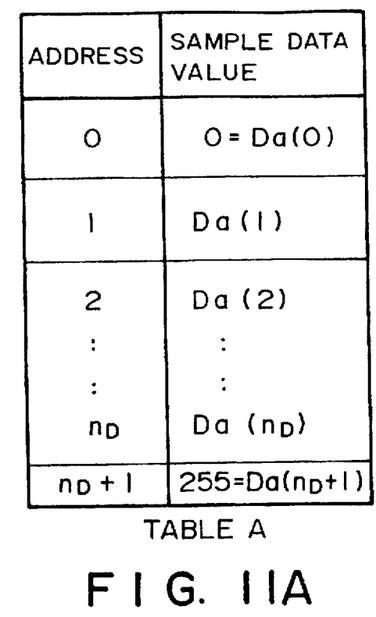
FIGS. 11A to 11D are views showing tables in the DSP and LUT in FIG. 7.
Figure 11B:
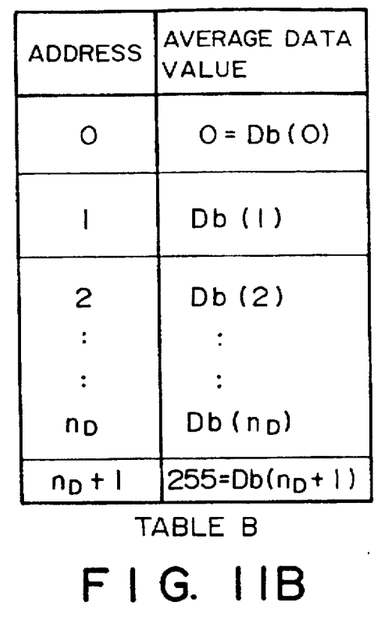
Figure 11C:
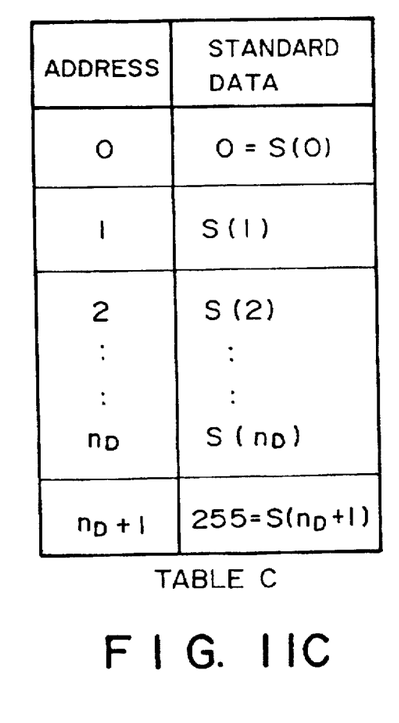
Figure 11D:
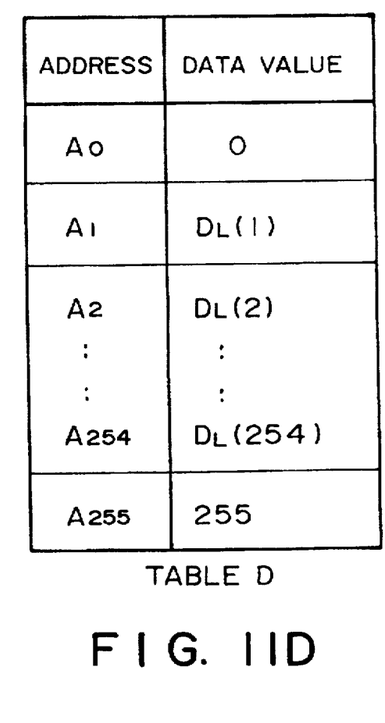

In the present embodiment, the ramp wave form to be sampled is assumed to be already subjected to automatic peak gain control in the DSP 6, and the look-up table 8 effects the compensation for the non-linearity of the levels. As shown in FIG. 10, there are provided $n_D$ sampling points from 1 to $n_D$ for the ramp wave form, and the sample data $D_a(1)$–$D_a(n_D)$ are stored in the RAM table A in the DSP 6, as shown in FIG. 11A. $D_a(0)$ and $D_a(n_D+1)$ respectively store "0" and "255". Also data of the sampling points 1–$n_D$ corresponding to a ramp wave form not requiring correction are stored, as reference data $S(1)$–$S(n_D)$ in a RAM table C of the DSP 6 as shown in FIG. 11C. Reference data $S(0)$ and $S(n_D+1)$ are respectively "0" and "255". Also a table B in FIG. 11B stores corrected sample data (average data in the present embodiment) $D_b(1)$–$D_b(n_D)$ corresponding to the sampling points 1–$n_D$. FIG. 11D shows the look-up table 8 containing calculated data $D_L(0)$–$D_L(255)$ respectively at addresses $A_0$–$A_{255}$. In the look-up table 8, the data $D_L(0)$ and $D_L(255)$ at addresses $A_0$ and $A_{255}$ are respectively "0" and "255".

In the following there will be explained the control sequence according to FIG. 9.

At first a predetermined value $n_F$ is placed as a frame count C2 (S1), and the table B is initialized (S2). Then the aforementioned value $n_D$ is placed as a sample count C1 corresponding to a sampling point (S3). Then sample data $D_a(C1)$ is set as a variable A (S4), and there is discriminated whether the absolute value of the difference between the sample data and corresponding reference data S(C1) is less than a predetermined value (S5).

The discrimination is conducted to identify how much the obtained sample data is distant from the reference data. If the sample data is far from the reference data, it is identified as an error, and is not used in the calculation of the data $D_b(C1)$ in the step S6, and the sequence proceeds to a step S7.

The step S6 sets X(C1)+A as X(C1). X(C1) is the sum of sample data of the sampling points corresponding to the sample count (C1), and the number of summed data is counted as Y(C1). Consequently the average data $D_b(C1)$ of the sample data at this sampling point is obtained by X(C1)/Y(C1).

The step S7 effects decrement of the sample count C1. The steps S4–S7 are repeated until C1=0 is reached, whereby the process on all the sampling points is completed (S8). Then the frame count is decreased (S9), and the steps S4–S9 are repeated on $n_F$ frames until C2=0 is reached. Thus $D_b(1)$–$D_b(n_D)$ assume the average values of the sample values of the ramp wave forms of $n_F$ frames, and the sample data that are assumed to be erroneous are excluded from the calculation of the average.

Then the correction data $D_L(1)$–$D_L(255)$ of the look-up table 8 are calculated with the above-mentioned average data $D_b(1)$–$D_b(n_D)$. The calculation is started by setting $D_L(0)$ and $D_L(255)$ as "0" and "255", and setting another sample count C3 as "1" (S11).

At first reference data S(C3) is set as data $D_L[D_b(C3)]$ of the address $A_{Db}(C3)$ (S12). This corresponds to an output S(C3) of the look-up table 8 in response to an input level $D_b(C3)$. Therefore, in case of $C_3$=1 for example, an output S(1) is obtained in response to an input $D_b(1)$. This data $D_L[D_b(C3)]$ and already obtained data $D_L[D_b(C3-1)]$ are used, in the linear approximation method, for calculating data $D_L[D_b(C3-1)]$–$D_L[D_b(C3)]$ at addresses $A_{Db}(C3-1)$–$A_{Db}(C3)$ (S13). Then the sample count C3 is step increased (S14), and the steps S12–S14 are repeated for each sampling point. The sequence is terminated when the sample count C3 reaches ($n_D$+1) (S15).

The above-explained procedure enables the correction data to be obtained in an extremely stable manner, since the correction data are determined by averaging plural data, excluding data assumed to be erroneous, so that the reproduction characteristics can be corrected in a stable manner.

Figure 12:
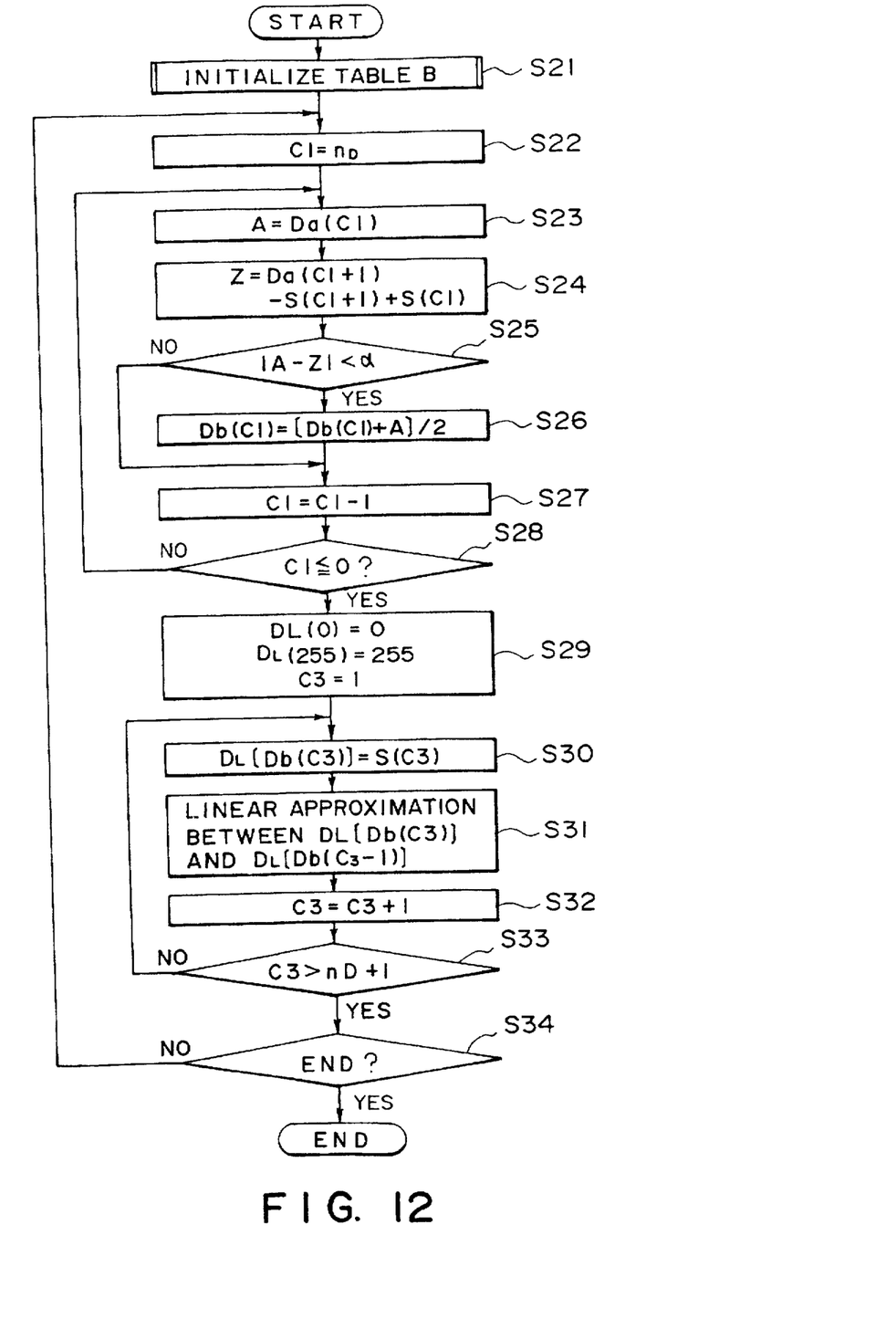
FIG. 12 is a flow chart showing another example of the control sequence of the CPU shown in FIG. 7.

FIG. 12 is a flow chart showing another calculating sequence of the CPU 7 shown in FIG. 7. At first the table B is initialized (S21), then the sample count C1 is set at $n_D$ (S22), and the variable A is set at the sample data $D_a(C1)$ (S23). Succeeding steps S24, S25 discriminate whether the sample data set as the variable A is erroneous, in a method different from that in FIG. 9. In FIG. 12, the difference between the sample data $D_a(C1+1)$ of the neighboring sampling point and the reference data S(C1+1) is added to the reference S(C1) of the current sampling point to obtain a predicted value Z of the current sample data (S24), and there is discriminated whether the difference between the predicted value Z and the current sample data is within a predetermined value α (S25). The sample data may become significantly different from the reference data in case a relatively large correction is required, and the present method is effective for such case since the possibility of mistaking such sample data, distant from the reference data, as erroneous data.

Then a step S27 sets $[D_b(C1)]+A]/2$ as $D_b(C1)$, whereby the data $D_b(C1)$ used for correction is composed, in descending weights, by ½ of the current sample data, by ¼ of the sample data of the immediately preceding frame, by ⅛ of the sample data of a second frame before the current frame, etc., and such data can also provide the correction data in a stable manner. Steps S29–S33 for calculating the correction data to be stored in the look-up table 8 are same as the steps S11–S15 in FIG. 9 and will not, therefore, be explained.

In the flow chart shown in FIG. 12, the steps S12–S33 are repeated until an end command is released (S34), for example at the end of the reproducing operation.

In the foregoing embodiment, the correction of the reproduction characteristics is achieved by the ramp wave form section of the reference signal, but the present invention is likewise applicable to the correction utilizing a step wave form section S shown in FIG. 2.

As explained in the foregoing, the signal reproducing apparatus shown in FIGS. 7 to 12 can effect the correction of the reproduction characteristics according to the reference signal in an extremely stable manner.

What is claimed is:

1. A signal reproducing apparatus, comprising:
   a) reproduction means for reproducing an information signal containing a reference signal from a recording medium;
   b) forming means for forming n bit digital information data corresponding to the information signal reproduced by said reproduction means;
   c) correction data forming means for detecting distortions of the reference signal contained in the information signal reproduced by said reproduction means by sampling a plurality of points of the reference signal and for forming a plurality of correction data each consisting of a plurality of bits, the plurality of the correction data being formed in conjunction with a plurality of values of the n bit digital information data;
   d) digital processing means for processing the n bit digital information data formed by said forming means; and
   e) correction means for receiving the n bit digital information data processed through said digital processing means and for converting the received n bit digital information data into m bit digital information data based on the correction data, wherein n and m are integers and m is larger than n.

2. An apparatus according to claim 1, wherein said reproduction means reproduces information signals of a plurality of channels, and said correction means is adapted to compensate the difference in characteristics of said reproduced information signals of the plurality of channels.

3. An apparatus according to claim 1, further comprising digital-analog converter means for converting the m bit digital information data output from said correction means into an analog signal.

4. An apparatus according to claim 3, wherein said correction means is provided immediately in front of said digital-analog converter means.

5. An apparatus according to claim 3, wherein said reproduction means comprises:
   a reproducing head for reproducing a modulated analog information signal from said recording medium;

demodulation means for demodulating the modulated analog information signal reproduced by said reproducing head; and analog-digital converter means for converting the analog information signal, demodulated by said demodulation means.

6. An apparatus according to claim 5, wherein said correction data forming means includes a circuit for extracting said reference signal from the digital information data output from said analog-digital converter means.

7. An apparatus according to claim 1, wherein said correction means comprises look-up table means storing said correction data and inputting the n bit digital information data processed through said digital processing means as an address, said look-up table means outputting at least a part of the m bit digital information data.

8. An apparatus according to claim 7, wherein said part of the m bit digital information data is lower bits thereof and said look-up table means, outputs only data corresponding to said lower bits.

9. An apparatus according to claim 8, wherein said correction means further includes means for forming bits other than said lower bits of the m bit digital information data, according to other data output from said look-up table means and upper bits of the digital information data processed through said digital processing means.

10. An apparatus according to claim 1, wherein said correction means comprises plural look-up table means, each storing correction data and inputting the n bit digital information data processed through said digital processing means as an address.

11. An apparatus according to claim 1, wherein said information signal periodically contains said reference signal, and said correction data forming means forms correction data according to plural reference signals contained in the information signal reproduced by said reproduction means.

12. A signal reproducing apparatus, comprising:
  a) reproduction means for reproducing an information signal containing a reference signal from a recording medium;
  b) forming means for forming digital information data corresponding to the information signal reproduced by said reproduction means;
  c) correction data forming means for forming correction data according to the reference signal contained in the information signal reproduced by said reproduction means; and
  d) correction means for correcting the digital information data formed by said forming means using said correction data and outputting corrected digital information data and replaces said digital information data with said corrected digital information data, wherein said correction means includes look-up table means for receiving the digital information data as an address and outputting lower bits of said corrected digital information data and computing means for computing upper bits of said corrected digital information data by using other data output from said look-up table means and the upper bits of the digital information data formed by said forming means.

13. An apparatus according to claim 12, wherein said digital information data has n bits and said corrected digital information data has m bits, and said look-up table means outputs lower Q bits of said corrected digital information data of m bits and said computing means forms upper (m–Q) bits of said corrected digital information data from the other data and (m–Q) bits of said digital information data of n bits, wherein n and m are integers and m is larger than n.

14. An apparatus according to claim 13, further comprising digital processing means for processing digital information signal corresponding to processing the n bit digital information data formed by said forming means.

15. A signal reproducing apparatus, comprising:
  a) reproduction means for reproducing an information signal periodically containing a plurality of reference signals from a recording medium;
  b) forming means for forming digital information data corresponding to the information signal reproduced by said reproduction means;
  c) correction data forming means for detecting a recording and reproducing characteristic of the information signal by detecting the plurality of reference signals contained in the information signal reproduced by said reproduction means and for forming sets of correction data, each set of the correction data being formed on the basis of detected value of one of the reference signals; and
  d) correction means for correcting the digital information data formed by said forming means and outputting corrected digital information data,
  wherein said correction means comprises two look-up table means each storing one of the sets of the correction data and determines the address corresponding to the digital information data formed by said forming means, and said two look-up table means alternatively stores the set of correction data and alternatively outputs the corrected digital data.

16. An apparatus according to claim 15, wherein, while one of the two look-up table means is subjected to the storage of said correction data, another of said two look-up table means inputs said digital information data as the address thereby releasing at least a part of said corrected digital information data.

17. An apparatus according to claim 15, wherein said correction means writes said correction data selectively in said two look-up table means and supplies said digital information data selectively to said two look-up table means.

* * * * *

UNITED STATES PATENT AND TRADEMARK OFFICE
CERTIFICATE OF CORRECTION

PATENT NO. : 5,793,547
DATED : August 11, 1998
INVENTOR(S) : Akio Fujii, etal.

It is certified that error appears in the above-identified patent and that said Letters Patent is hereby corrected as shown below: Title page:

Item [57], line 2, delete "an"

Col. 1, line 59, delete "a-line" and insert --a line--.
Col. 3, line 39, insert --stores-- after "which".
Col. 3, line 39, delete "said"

Col. 3, line 56, delete "said"

Col. 10, line 6, delete [Db(C1)] + A] and insert [Db(C1) + A]

Signed and Sealed this

Thirtieth Day of March, 1999

Attest:

Q. TODD DICKINSON

*Attesting Officer*     *Acting Commissioner of Patents and Trademarks*